United States Patent
Magana et al.

(10) Patent No.: US 6,891,592 B2
(45) Date of Patent: May 10, 2005

(54) WAFER LEVEL ELECTRO-OPTICAL SORT TESTING AND WAFER LEVEL ASSEMBLY OF MICRO LIQUID CRYSTAL-ON SILICON (LCOS) DEVICES

(75) Inventors: John F. Magana, San Jose, CA (US); M. Lawrence A. Dass, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/205,469

(22) Filed: Jul. 26, 2002

(65) Prior Publication Data

US 2004/0017537 A1 Jan. 29, 2004

(51) Int. Cl.[7] .............................................. G02F 1/1341
(52) U.S. Cl. ........................ 349/189; 349/187; 349/190; 324/770
(58) Field of Search ................................ 349/187, 189, 349/190; 216/2.3; 324/770

(56) References Cited

U.S. PATENT DOCUMENTS

| | | | | |
|---|---|---|---|---|
| 5,910,830 A | * | 6/1999 | Nam ........................... | 349/158 |
| 5,963,281 A | * | 10/1999 | Koons et al. .................. | 349/73 |
| 5,963,289 A | | 10/1999 | Stefanov et al. | |
| 6,195,149 B1 | * | 2/2001 | Kodera et al. ............... | 349/187 |
| 6,487,461 B1 | * | 11/2002 | Gaynes et al. ................ | 700/58 |
| 2001/0004278 A1 | * | 6/2001 | Fukumori et al. .......... | 349/153 |
| 2002/0159020 A1 | * | 10/2002 | Sojourner et al. .......... | 349/189 |

\* cited by examiner

*Primary Examiner*—Tarifur R. Chowdhury
*Assistant Examiner*—Michael H. Caley
(74) *Attorney, Agent, or Firm*—Jay P. Beale

(57) ABSTRACT

A method of manufacturing liquid crystal devices on a silicon substrate is disclosed. Such a method is accomplished by preparing a silicon substrate having a plurality of die arranged in an array with scribe streets between the dies, and alignment marks within designated scribe streets; preparing a glass substrate having scribe lines, alignment marks within designated scribe lines and openings for filing liquid crystal; attaching the glass substrate to the silicon substrate using the alignment marks on the glass substrate and on the silicon substrate to form a silicon-glass assembly; filling liquid crystal, via the openings on the glass substrate, into a cell gap of each die on the silicon-glass assembly, and sealing the openings on each die to form a liquid crystal device; and separating liquid crystal devices from the silicon-glass assembly along the scribe lines on the glass substrate.

27 Claims, 8 Drawing Sheets

WAFER LEVEL ELECTRO-OPTICAL SORT TESTING AND WAFER LEVEL ASSEMBLY OF MICRO LIQUID CRYSTAL-ON SILICON (LCOS) DEVICES

FIELD

The present invention relates generally to display systems, such as electro-optical or liquid crystal display systems and, more specifically, relates to wafer level electro-optical sort testing and wafer level assembly of micro liquid crystal-on silicon (LCOS) devices used for display.

BACKGROUND

Liquid crystals are commonly used to construct displays used in a wide variety of electronic devices, such as digital watches, calculators, handheld mobile phones, miniature television sets as well as large, flat projection screens for home entertainment systems, liquid-crystal computer displays for portable computers, and optical devices.

Figure 1:
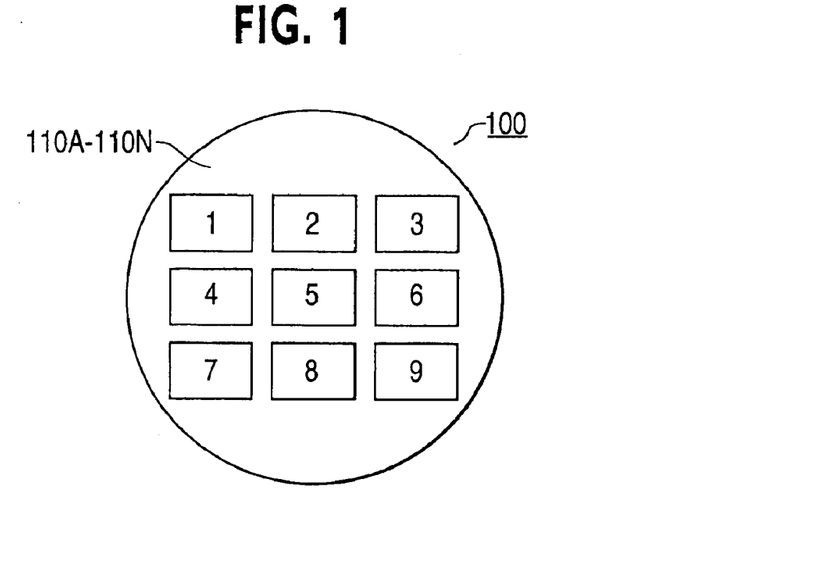
FIG. 1 illustrates an example silicon wafer including a plurality of dies.

Liquid crystal-based devices are typically formed on a silicon wafer 100, as shown in FIG. 1, including a plurality of dies 110A–110N, such as die #1 to die #9, for example, using an emerging display technology, known as liquid crystal-on silicon (LCOS). Each die 110A–110N on the silicon wafer 100 may be provided with an active matrix of displaying processing functions of a micro LCOS device, and one or more integrated circuit (IC) chips such as microprocessors, chipsets, system on-chips, application specific integrated circuits (ASICs), digital signal processing (DSP) systems and other types of programmable logic arrays or devices. In general, the entire silicon wafer 100 including a plurality of dies 110A–110N and the cover glass (not shown) are assembled for mass production.

Figure 2:
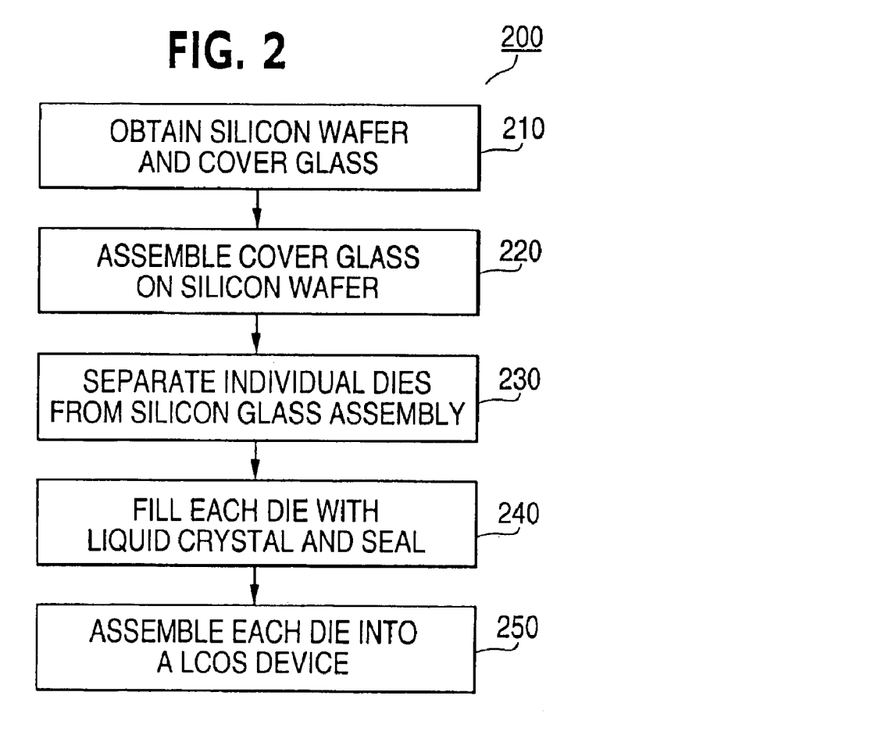
FIG. 2 illustrates an example flow diagram of a liquid crystal-on silicon (LCOS) device manufacture process from a silicon wafer.

FIG. 2 illustrates an example flow diagram of a current process of manufacturing LCOS devices from a silicon wafer shown in FIG. 1. As shown in FIG. 2, the silicon wafer 100 including a plurality of dies 110A–110N shown in FIG. 1, and the cover glass (not shown) are received separately at block 210. The cover glass is then assembled on the silicon wafer to form a silicon-glass assembly at block 220. The silicon-glass assembly is then singulated, or broken and separated into individual die at block 230. After individual dies are separated from the assembled wafer, each die is filled with a liquid crystal material, end-sealed at block 240, and then wire-bonded and assembled into a LCOS device at block 250. Subsequently, each LCOS device may be tested both for electrical functionality (i.e., if there is no electrical disconnect or short circuit) and imager functionality (i.e., if an image follows specification) before functioning units can be packaged into a flex cable or assembled into any other package with a variety of different contacts for connecting to the outside world.

However, current methods of mass production of LCOS devices suffer a number of disadvantages. First, the liquid crystal fill is done on die level after singulating the cover glass and individual die from the wafer. This is prone for contamination in cell gap due to debris from singulation, which interferes with subsequent processing of LCOS devices. Secondly, the electro-optical testing of individual micro LCOS devices is done after silicon backplane assembly and assembly of each die into LCOS devices. Extensive backplane assembly can be costly and time consuming due to its requirements for expensive equipment, long processing times, and control of many process variables. Moreover, the electro-optical testing of individual micro LCOS device after assembly of die into LCOS devices is not desirable or manufacturable due to high cost and low yield as all dies are assembled irrespective of whether an individual die is functional or not.

Therefore, a need exists for a more efficient method of mass production of LCOS devices with a simpler and more direct wafer level liquid crystal filling process, a cleaner cover glass singulation process and an electro-optical sorting and testing of LCOS devices at wafer level for identification and assembly of a good die

BRIEF DESCRIPTION OF THE DRAWING(S)

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, example sizes/values/ranges may be given, although the present invention is not limited to the same. As manufacturing techniques mature over time, it is expected that LCOS devices and IC chips of smaller size can be manufactured. In addition, well known power/ground connections to IC chips and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details.

The present invention is applicable for use with all types of semiconductor wafers and integrated circuit (IC) devices, including, for example, MOS transistors, CMOS devices, MOSFETs, and liquid display devices which may become available as semiconductor technology develops in the future. However, for the sake of simplicity, discussions will concentrate mainly on exemplary use of a wafer level electro-optical sort testing and wafer level assembly of micro liquid crystal-on-silicon (LCOS) devices on a silicon substrate, although the scope of the present invention is not limited thereto. The terms "substrate," "silicon substrate" and "wafer" may be used interchangeably herein below.

Figure 3:
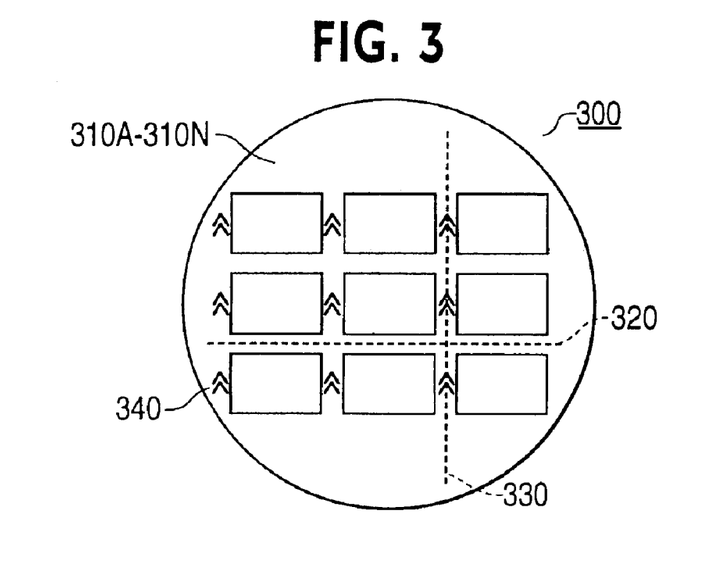
FIG. 3 illustrates an example silicon wafer including a plurality of dies and one or more scribes with alignment marks according to an embodiment of the present invention.

Attention now is directed to the drawings and particularly to FIG. 3, in which an example silicon wafer including a plurality of dies prepared according to an embodiment of the present invention is illustrated. As shown in FIG. 3, the entire wafer 300 may contain thereon an array of dies 310A–310N. Each die 310A–310N on the silicon wafer 300 may be rectangular or square, and may contain an active matrix (not shown) of displaying processing functions of a LCOS device, and one or more integrated circuit (IC) chips (not shown) such as microprocessors, chipsets, system on-chips, application specific integrated circuits (ASICs), digital signal processing (DSP) systems and other types of programmable logic arrays or devices.

The silicon wafer 300 may also contain horizontal and vertical scribe streets 320, 330 between the dies 310A–310N; and one or more alignment marks 340 formed within designated ones of the scribe streets 320, 330 for subsequent alignment with a top plate in a form of a cover slip glass used to make liquid crystal cell with the silicon wafer 300.

Figure 4:
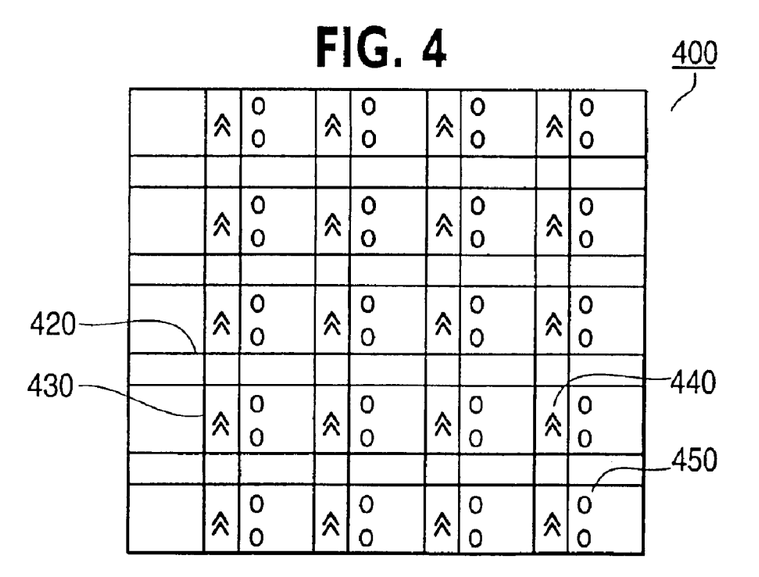
FIG. 4 illustrates an example cover slip glass including one or more scribes with alignment marks according to an embodiment of the present invention.

FIG. 4 illustrates an example glass slip cover 400 prepared according to an embodiment of the present invention. The glass slip cover 400 may be an optically transparent glass substrate having a variety of sizes and shapes, such as rectangular, square or circular, and can be easily mounted and aligned with the silicon wafer 300 for enabling the incoming light to pass through to alter the liquid crystal and create images which can be directly viewed or projected onto a projection screen.

As shown in FIG. 4, the glass slip cover 400 may contain one or more horizontal scribe lines 420; one or more vertical scribe lines 430; one or more alignment marks 440 formed within designated ones of the scribe lines 420 and 430 for subsequent alignment with the silicon wafer 300; and openings (through vias) 450 for enabling the manufacturer to fill therein a liquid crystal material from the top at a wafer level. The scribe lines 420 and 430 on the cover slip glass 400 are designed to enable the manufacturer to singulate or separate individual die from a silicon-cover slip assembly. The alignment marks 440 on the cover slip glass 400 are designed to match with features on the silicon wafer 300, i.e., the alignment marks 340 on the silicon wafer 300 for enabling the manufacturer to easily and precisely align the cover slip glass 400 and assemble with the silicon wafer 300 to form a silicon-cover slip assembly.

Figure 5:
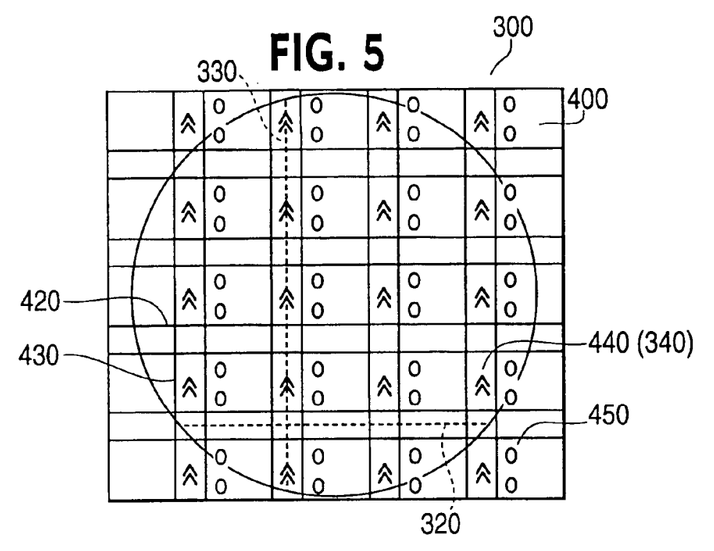
FIG. 5 illustrates an example silicon wafer assembled on the cover slip glass according to an embodiment of the present invention.

FIG. 5 illustrates an example glass slip cover 400 assembled on the silicon wafer 300, that is, a silicon-cover slip assembly. When the glass slip cover 400 is mounted or attached on the silicon wafer 300, the alignment marks 440 on the cover slip glass 400 are precisely aligned with the alignment marks 340 on the silicon wafer 300. Likewise, the scribe lines 440 and 450 on the cover slip glass 400 are aligned with the scribe streets 320 and 330 on the silicon wafer 300.

As described with reference to FIGS. 3–5, both the silicon wafer 300 and the cover slip glass 400 are prepared in advance of wafer level assembly in order to enable the manufacturer to mass produce a plurality of LCOS devices on a silicon wafer 300 using a simpler and more direct wafer level liquid crystal filling process via openings 470 on the cover slip glass 400, and an electro-optical sorting and testing of LCOS devices at wafer level for identification and assembly of a good die before the silicon-cover slip assembly can be singulated or broken into individual die to avoid singulation debris.

Figure 6:
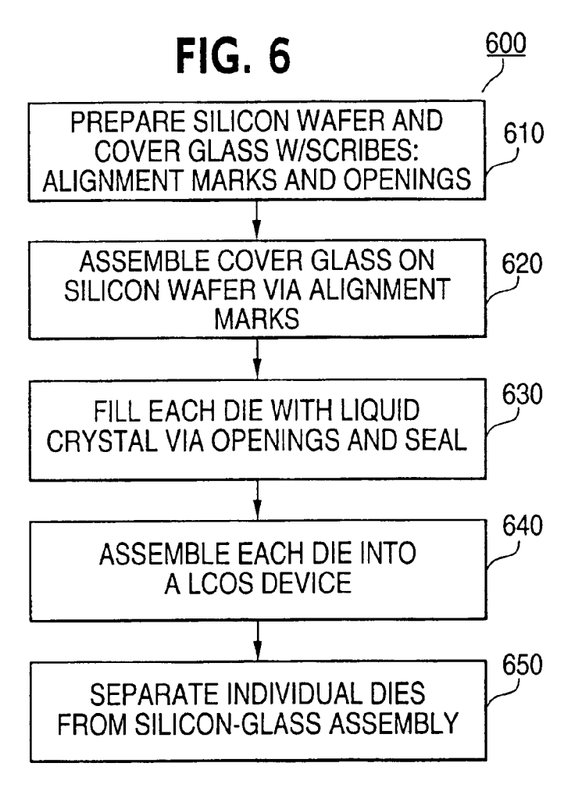
FIG. 6 illustrates an example flow diagram of a liquid crystal-on silicon (LCOS) device manufacture process from a silicon wafer according to an embodiment of the present invention.

Turning now to FIG. 6, an example flow diagram of a liquid crystal-on silicon (LCOS) device manufacture process from a silicon wafer according to an embodiment of the present invention is illustrated. As shown in FIG. 6, both the silicon wafer 300 including a plurality of dies 310A–310N and the cover slip glass 400 are prepared in the manner described with reference to FIGS. 3–4 at block 610. The cover slip glass 400 may then be assembled on the silicon wafer 300 using the alignment marks 440 on the cover slip glass 400 and the alignment marks 340 on the silicon wafer 300 at block 620. Both the cover slip glass 400 and the silicon wafer 300 are attached using epoxy and cured. The individual die within the silicon-cover slip assembly may be filled with liquid crystal material through openings on the cover slip glass 400, and then the openings on the cover slip glass 400 are then sealed at block 630. Liquid crystal is filled into the openings of the cover slip glass 400 after creating vacuum either locally on each die or globally. The openings on the cover slip glass 400 are sealed by applying epoxy either from epoxy-coated mat or screen-printing, and then cured.

Next, the individual die in the silicon-cover slip assembly may be assembled into a LCOS device for wafer level electro-optical sort testing of LCOS devices at block 640. Specifically, the silicon-cover slip assembly may then be singulated (scribed) selectively on the cover slip glass 400 to expose bond pads and scribe streets on the silicon wafer 300. Each die is covered with cover slip filled with liquid crystal, and the cover slip glass 400 is grounded using conducting epoxy with the die. The silicon-cover slip assembly is then taken to a sort tester equipped with projection optics where each die can be sort tested both for electrical functionality and imager functionality.

Then the silicon-cover slip assembly can be singulated, or broken and separated into individual cell, or individual die from the top of the cover slip glass 400 along the scribe lines at block 650. Afterwards, functioning units can then be packaged into a flex cable or assembled into any other package with a variety of different contacts for connecting to the outside world.

As described with reference to FIG. 6, the silicon-cover slip assembly contains openings for wafer level liquid crystal fill from the top, and provides for a cleaner process to singulate cover slip glass to expose the bond pads without debris for subsequent wafer level electro-optic testing of LCOS devices and identifying the KGD (know good die). As a result, LCOS die can then be wire bonded and assembled directly into package with no further back plane assembly.

FIGS. 7A–7G are example cross-sectional diagrams of a step-by-step process of manufacturing a LCOS device shown in FIG. 6. For the sake of simplicity, only a cross-sectional view of an individual die on the silicon wafer 300 shown in FIG. 3 is described herein below. Silicon wafer 300 may be a complementary metal oxide semiconductor (CMOS) silicon substrate. Each silicon die within the silicon wafer 300 may include a processor-based region (not shown) containing processor-based circuitry which does not need light exposure; and a pixel array region (not shown) which works with exposure to external light. The pixel array region may include an array of mirrors arranged in rows and columns for forming corresponding pixels of an image, and a liquid crystal for display functions of a LCOS device. The processor-based region may include, for example, a microprocessor integrated into the silicon die or one or more chipsets, system on-chips, application specific integrated circuits (ASICs), digital signal processing (DSP) systems and other types of programmable logic arrays or devices, including pixel processing circuitry for processing display functions of a LCOS device.

Figure 7A:
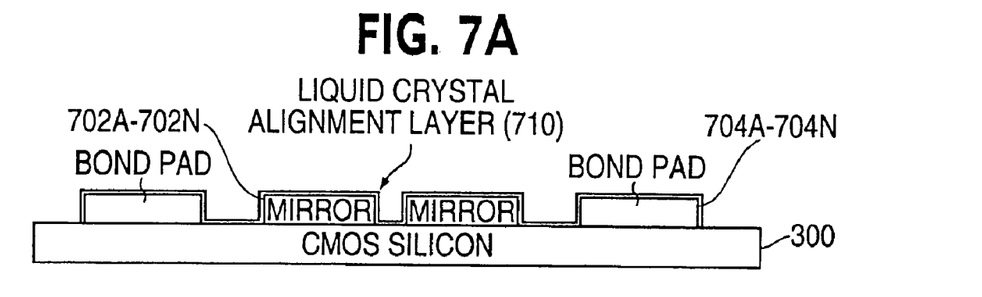
FIGS. 7A–7G are example cross-sectional diagrams of a step-by-step process of manufacturing a LCOS device according to an embodiment of the present invention.

As shown in FIG. 7A, each silicon die within the silicon wafer 300 may contain mirror pads 702A–702N and bond pads 704A–704N. The mirror pads 702A–702N may be formed on each die within the silicon wafer 300 and, in particular, in the pixel array region (not shown) of each die using liquid crystal-on silicon (LCOS) technology. The mirror pads 702A–702N may be rectangular or square, and together form an array of mirrors to define an array of pixel elements in conjunction with the liquid crystal material positioned over the mirrors. In other words, each mirror pad represents each cell or pixel of the overall display and has a transistor structure integrated in the silicon wafer 300 in the manner known using LCOS technology.

The bond pads 704A–704N may be patterned and formed on each die within the silicon wafer 300 and, in particular, in the processor-based region (not shown) to enable connections with external circuitry such as a microprocessor. An alignment layer 710 may be applied on the surface of the silicon wafer 300 over the mirror pads 702A–702N and the bond pads 704A–704N of each silicon die, for subsequent alignment of liquid crystal fill. Such an alignment layer 710 can be applied on the surface of the silicon wafer 300, via standard industry processes of spin coating, offset printing or even spraying.

Figure 7B:
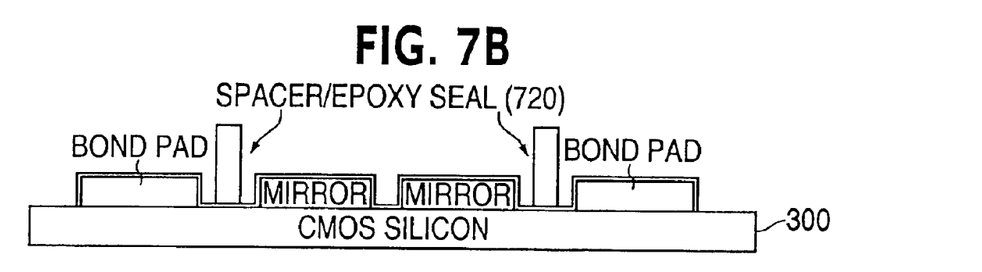

After the alignment layer 710 is applied and cured on the surface of the silicon wafer 300, a continuous layer of spacers 720 may be applied around each pixel array region (not shown) of each silicon die in order to maintain the desired spacing with the processor-based region (not shown) as shown in FIG. 7B. The spacers 720 may also provide a sealing function to retain the liquid crystal material. Typically, the spacers 720 are mixed into sealant material such as epoxy, and may be in the form of sphere(s) or rod(s) dispensed and dispersed on the silicon wafer 300 to provide cell gap control and uniformity. Epoxy can also be transferred from a pre-patterned mat or epoxy dispenser around each die within the silicon wafer 300.

Figure 7C:
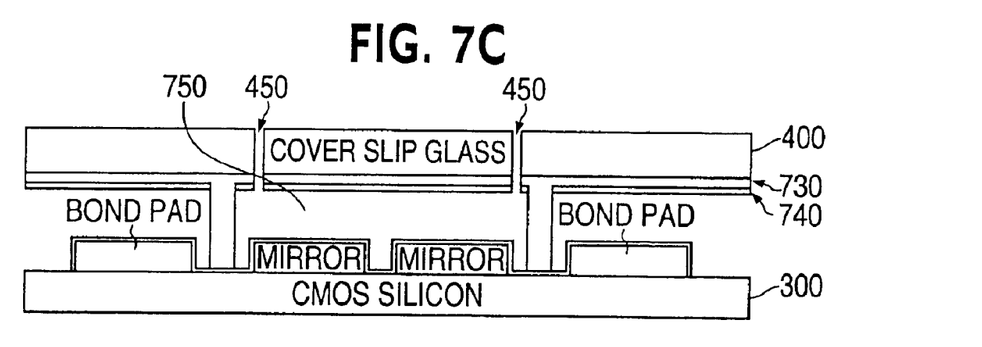

Next, as shown in FIG. 7C, the cover slip glass (top plate) 400 with openings 450 shown in FIG. 4 may be aligned to the silicon wafer 300, via respective alignment marks 340 and 440 on the silicon wafer 300 and on the cover slip glass 400, to match with each die and then cured. Alignment of the cover slip glass 400 and the silicon wafer 300 may be accomplished with the aid of video cameras with lens magnification using the respective alignment marks 340 and 440 on the silicon wafer 300 and on the cover slip glass 400. The machines may range in complexity from manual to fully automated machines with pattern recognition capability to align the opposing silicon wafer 300 and cover slip glass 400. Prior to the alignment, the cover slip glass 400 may also be coated by an indium tin oxide (ITO) layer 730 and an alignment layer 740. Both the ITO layer 730 and the alignment layer 740 can also be applied on the surface of the cover slip glass 400, via standard industry processes of spin coating, offset printing or even spraying. Both the alignment layer 710 applied on the silicon wafer 300 (i.e., lower alignment layer) and the alignment layer 740 applied on the cover slip glass 400 (i.e., upper alignment layer) may be formed by polyimide to define walls of a cavity holding the liquid crystal material The polyimide layers may also be used to provide electrical isolation between capacitor plates which sandwich the liquid crystal material However, other insulation materials may be used in place of, or in addition to the polyimide layers.

Figure 7D:
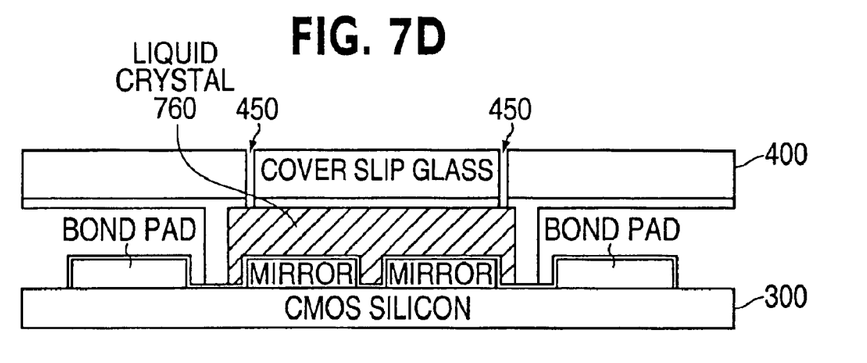
Figure 7E:
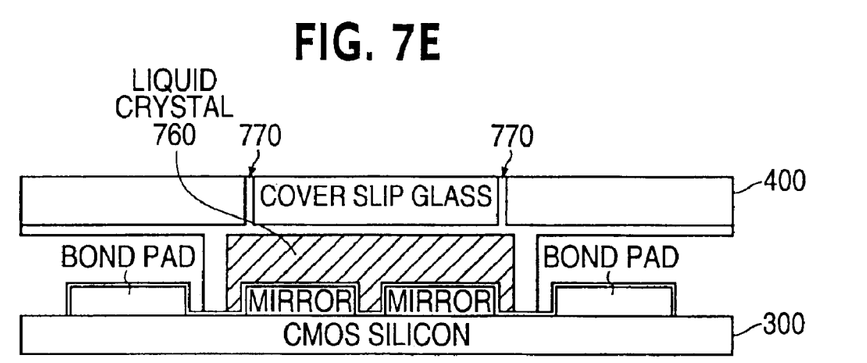

Final cell gap 750 between the silicon wafer 300 and the cover slip glass 400 may be set by pressing the previously tacked laminates in a UV or thermal press. In a UV press, the silicon wafer 300 and the cover slip glass 400 may be loaded into a press where at least one or both of the press platens are quartz, in order to allow UV radiation from a UV lamp to pass unabated to the seal spacer epoxy. Exposure time and flux rates are process parameters determined by the equipment and adhesive materials. Thermally cured spacer epoxies require that the top and bottom platens of a thermal press be heated. The spacer seal may then be post-cured and hardened in an oven. The two opposing substrates have been pressed and set on the spacer material After the alignment, the cell gap 750 between the silicon wafer 300 and the cover slip glass 400 may be evacuated, and filled with liquid crystal 760 by bringing a liquid crystal material in contact with the cover slip glass 400, via openings 450 as shown in FIG. 7D. Afterwards, the openings 450 on the cover slip glass 400 may be sealed using epoxy 770 from a pre-made mat or by screen printing, and then cured by UV radiation and/or by thermal means to complete the LCOS device, as shown in FIG. 7E. For example, the liquid crystal 760 may be drawn into the cell gap(s) 750 by capillary action and continuously filled by pressure from the venting of the vacuum fill chamber. The vacuum oven may be evacuated to a desirable pressure. The vacuum chamber may be vented (back-filled typically with nitrogen or argon gas) at some prescribed rate defined by process optimization.

Figure 7F:
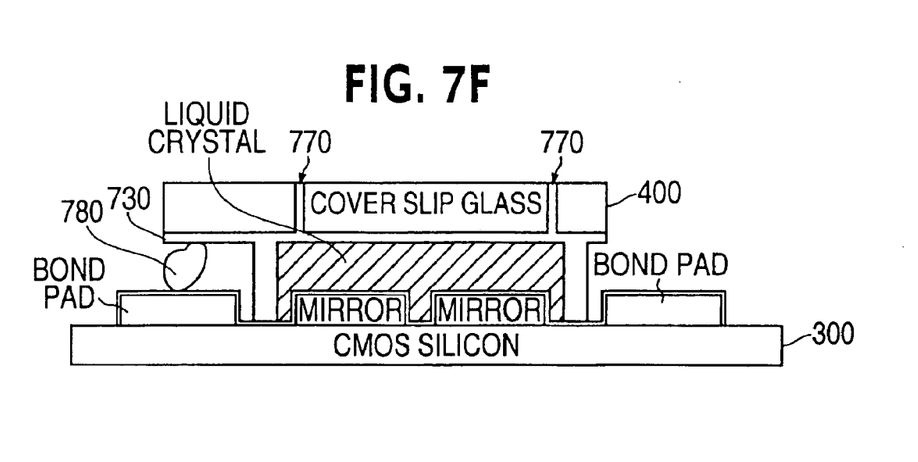

After the openings on the cover slip glass 400 are sealed with epoxy 770, for example, the silicon glass assembly may be singulated such a way that only the cover-slip glass 400 over designated bond pad areas outside the spacers 720 is removed as shown in FIG. 7F. Next, a conducting paste 780 may then be applied to the ITO layer 730 applied on the cover slip glass 400 and designated ones of bond pads 704A–704N to ground the ITO layer 730.

Figure 7G:
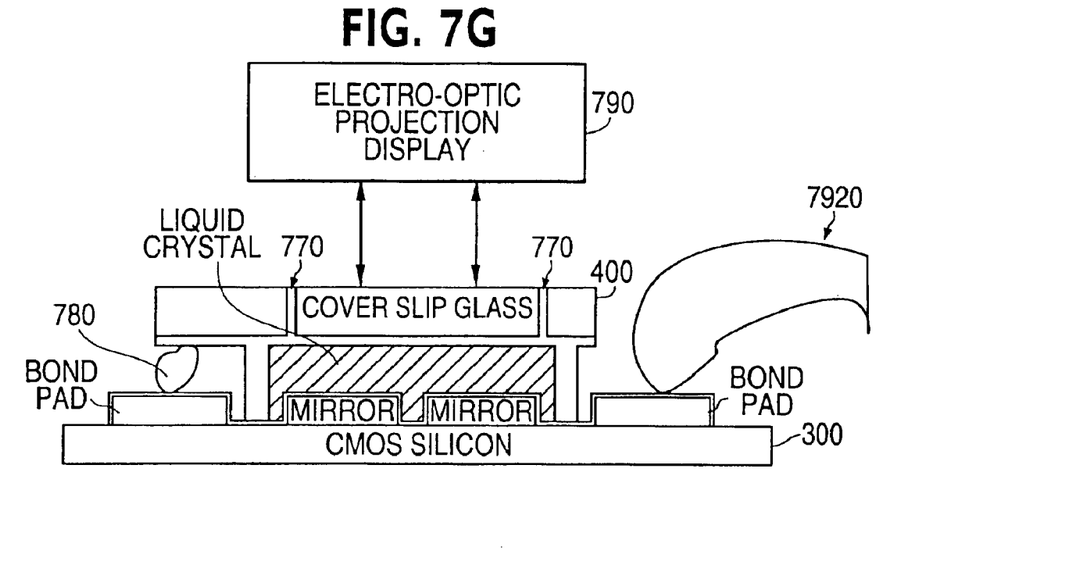

The silicon glass assembly can then be tested in a sort tester equipped with electro-optic projection assembly 790 as shown in FIG. 7G. In addition, the bond pads 704A–704N may be probed and verified via a probe card 792 by the sort tester. The electro-optic performances of each die can be categorized for both electrical functionality (i.e., if there is no electrical disconnect or short circuit) and imager functionality (i e., if an image follows specification).

Lastly, the silicon glass assembly can then be singulated, broken or separated into individual die along the scribe lines 420 and 430 on the cover slip glass 400, and the good die can then be packaged into a flex cable or assembled into any other package with a variety of different contacts for connecting to the outside world.

The singulation process of the silicon glass assembly into individual die may be described as follows. The general references to horizontal and vertical are for explanation purposes only, and do not limit the scope or application of the invention to any particular arrangement or orientation. The scribe lines 420 and 430 on the cover slip glass 400 as shown in FIG. 4 may be set at a certain distance from the edge of the spacer seal 720. In addition, scribe lines may optionally be placed along the designated scribe streets 320 and 330 on the silicon wafer 300 between any two adjacent die. This way the silicon scribe lines on the silicon wafer 300 shown in FIG. 3, and the glass scribe lines 440 and 450 on the cover slip glass 400 may coincide so that the silicon dies can be separated from the silicon glass assembly.

Silicon dies may be separated from the array by any of the following methods. The order in which the array (glass first) substrate is scribed is important when conventional solid state cameras are used for viewing and alignment in a scribe machine. The scribe tool may be aligned with the scribe lines and processed. The resultant scribe lines in the glass are used as reference marks to align the silicon wafer scribe streets (lane). These scribe lanes may be coincident with the glass scribe lines or uniformly offset. The dies are then separated from the array by venting the scribes on both substrates. Automatic breaking is done by commercially available guillotine or fulcrum breaking machines. The silicon dies can also be separated by hand.

Separation may also by done by glass scribing and partial sawing of the silicon wafer. Sawing requires an additional step at gasket dispense. Sawing is done in the presence of a high-pressure jet of water. Moisture must not be allowed in the area of the fill port or contamination of the polyimide alignment layer will occur. Therefore, at gasket dispense, an additional gasket bead may be dispensed around the perimeter of the wafer. The end of each scribe/saw lane must be initially left open so as to let air vent during align and press processes. After the array has been pressed and the gasket material cured, the vents are then closed using either the gasket or end-seal material. The glass is then aligned and scribed as described above. Sawing of the wafer is done from the backside of the silicon where the saw streets are aligned relative to the glass scribe lanes described above. The wafer may be then sawed to a depth of 50%–90% of its thickness, and subsequently separated as described above.

Alternatively, both the glass and silicon substrates may be partially sawed prior to die separation. With the same gasket seal configuration, vent and seal processes as described above, saw lanes may be aligned on the glass substrates The glass may then be sawed to a depth between 50% and 95% of its thickness. The silicon substrate may be sawed and the silicon dies separated as described above.

Figure 8:
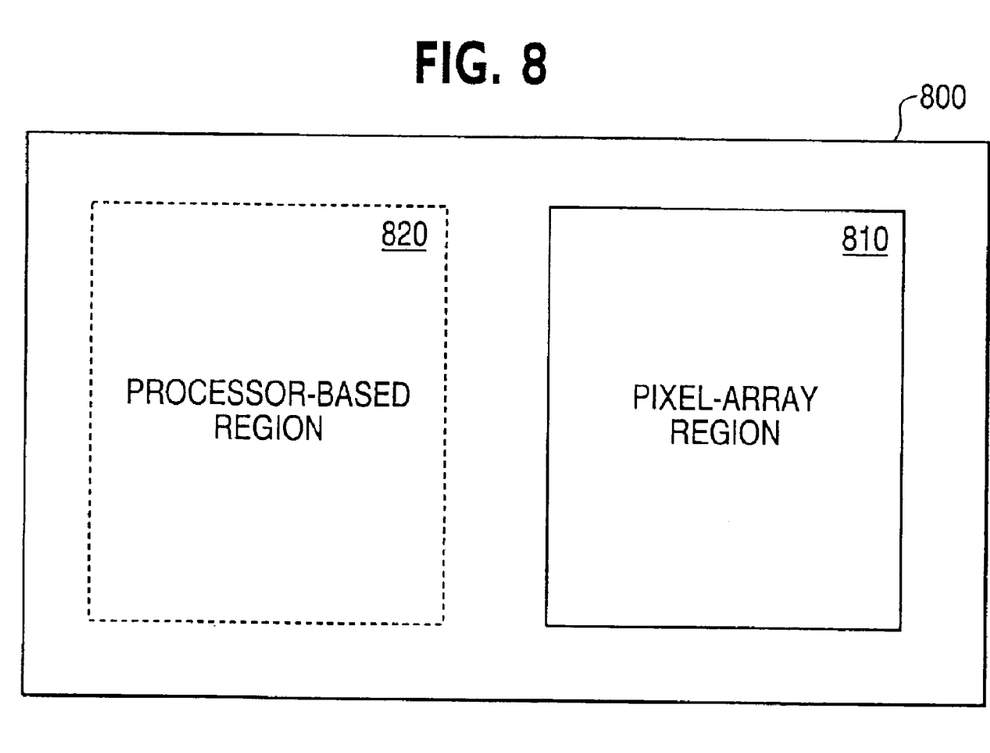
FIG. 8 illustrates an example silicon die according to an embodiment of the present invention.

Each silicon die 800, as shown in FIG. 8, may include a pixel array region 810 containing an array of mirrors arranged in rows and columns for forming corresponding pixels of an image, and a liquid crystal for display functions of a LCOS device in accordance with an embodiment of the present invention; and a processor-based region 820 arranged adjacent to (or alternatively underneath) the pixel array region 810 for containing processor-based circuitry. However, the arrangement of the pixel array region 810 and the processor-based region 820 is not limited thereto. Other die arrangements may be available and more suitable for large-scale manufacture of LCOS devices if minimal silicon real estate is desired. For example, the processor-based circuitry may be formed on the backside of a silicon wafer and provided with electrical coupling through trenches.

The pixel array region 810 may include a plurality of reflective mirrors defined on a silicon die 800 in accordance with an embodiment of the present invention. With LCOS technology, the liquid crystal display is formed in association with the same silicon wafer that forms complementary metal oxide semiconductor (CMOS) circuit elements. These mirrors may be formed to alter the liquid crystal responsive to potentials to modulate the incoming light to create images. These images can be directly viewed or projected onto a projection screen.

The processor-based region 820 may be coupled by bonding pads, via bumps. The bumps may be conventional solder balls which are utilized in microelectronic packaging, variously called flip chip packaging, bump bonding and surface mount packaging. The bumps may then be surface mounted to an electrical interconnection for connecting the silicon die 800 to external circuitry such as an external keyboard or keypad to allow the user to provide input commands to the processor-based region 810.

Figure 9:
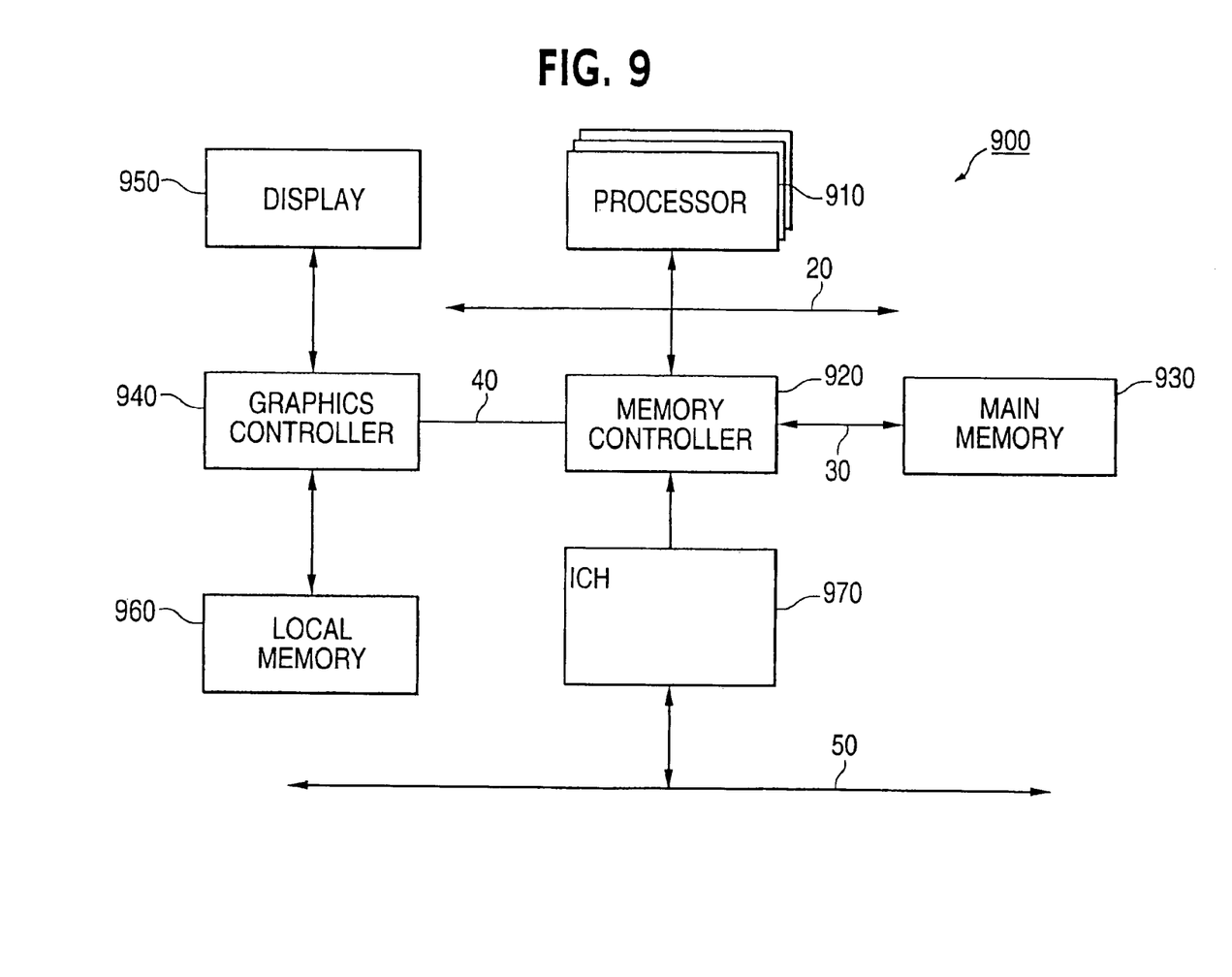
FIG. 9 illustrates an example implementation of an example silicon die according to an embodiment of the present invention.

Referring now to FIG. 9, an example implementation of an example silicon die according to an embodiment of the present invention is illustrated. As shown in FIG. 9, an example computer system 900 such as a laptop or handheld computer system, as examples, may include a liquid crystal display to generate images for the computer system 900. The computer system 900 may include one or more processors or central processing units (CPU) 910 such as Intel® i386, i486, Celeron™ or Pentium® processors, a memory controller 920 connected to one or more processors 910 via a front side bus 20, a main memory 930 connected to the memory controller 920 via a memory bus 30, a graphics controller 940 connected to the memory controller 920 via a graphics bus 40 (e.g., Advanced Graphics Port "AGP" bus), and an IO controller hub (ICH) 970 connected to the memory controller 920 for access to a variety of I/O devices and the like, such as: a Peripheral Component Interconnect (PCI) bus 50 as described in the latest version of "PCI Local Bus Specification, Revision 2.1" set forth by the PCI Special Interest Group (SIG) on Jun. 1, 1995 for added-on arrangements (e.g., expansion cards) with new video, networking, or disk memory storage capabilities. The graphics controller 940 may be used to control a visual display of graphics and/or video images on a display 950. A local memory 960 (i.e., a frame buffer) may be a separate memory dedicated to graphics applications to store pixel data from the graphics controller 940, one or more processors 910, or other devices within the computer system 900 for a visual display of video images on the display 950. The display 950 may be an active matrix of liquid crystal display implemented by a pixel array region that includes an array of pixel cells arranged in rows and columns that form corresponding pixels of an image according to an embodiment of the present invention as described above.

In this manner, one or more processors 910 may store image data that indicate intensity values for the images to be displayed on the liquid crystal display 950. Thus, the silicon die 800 may integrate all of the components illustrated in FIG. 9 with the exception, in some embodiments, of the main memory 930.

As described from the foregoing, the present invention advantageously provides a more efficient method of mass production of LCOS devices with a simpler and more direct wafer level liquid crystal filling process, a cleaner cover glass singulation process and an electro-optical sorting and testing of LCOS devices at wafer level for identification and assembly of a good die. Potential applications of the disclosed invention include optical information storage and processing systems, opto-electronic systems, displays, and electrically programmable diffractive optical elements and beam shaping devices. Smart spatial light modulators with active-matrix addressing can be employed to imprint a two-dimensional data page on an optical beam, with applications in displays, optical memories, optical computing, opto-electronic systems and programmable diffractive optical elements.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications may be made to adapt the teachings of the present invention to a particular situation without departing from the scope thereof. Therefore, it is intended that the present invention not be limited to the various example embodiments disclosed, but that the present invention includes all embodiments falling within the scope of the appended claims.

What is claimed is:

1. A method of manufacturing liquid crystal devices on a silicon substrate, comprising:
    preparing a silicon substrate having a plurality of die arranged in an array with scribe streets between the dies, and alignment marks within designated scribe streets;
    preparing a glass substrate having scribe lines, alignment marks within designated scribe lines and openings for filing liquid crystal;
    attaching the glass substrate having openings to the silicon substrate using the alignment marks on the glass substrate and on the silicon substrate to form a silicon-glass assembly;
    filling liquid crystal, via the openings on the glass substrate, into a cell gap of each die on the silicon-glass assembly, and sealing the openings on each die to form a liquid crystal device;
    removing a portion of the glass subatrate to expose the silicon substrate and facilitate testing of the liquid crystal device; and
    separating liquid crystal devices from the silicon-glass assembly along the scribe lines on the glass substrate.

2. The method as claimed in claim 1, further performing an electro-optical sort testing of each liquid crystal device on the silicon-glass assembly for electrical functionality and imager functionality after the liquid crystal fill but before liquid crystal devices are separated from the silicon-glass assembly along the scribe lines.

3. The method as claimed in claim 2, wherein the scribe lines and the alignment marks on the glass substrate are designed to match the scribe streets and the alignment marks on the silicon substrate.

4. The method as claimed in claim 2, wherein the liquid crystal is filled into the cell gap by bringing a liquid crystal material onto the glass substrate after creating vacuum either locally on each die of the silicon-glass assembly or globally on all dies of the silicon-glass assembly.

5. The method as claimed in claim 2, wherein the electro-optical sort testing of each liquid crystal device on the silicon-glass assembly is performed by selectively singulating the silicon-glass assembly to expose bond pads and scribe streets on the silicon substrate and electrically connecting the bond pads with a sort tester equipped with projection optics to test for electrical functionality and imager functionality.

6. The method as claimed in claim 2, wherein each liquid crystal device, after tested for electrical functionality and imager functionality, is packaged into a flex cable or assembled into an electronics package with a variety of different contacts for connecting to an external source.

7. The method as claimed in claim 2, wherein the glass substrate is attached to the silicon substrate by an epoxy seal serving as a spacer in a form of a sphere or a rod dispensed and dispersed on the silicon substrate to provide cell gap control and uniformity.

8. The method as claimed in claim 2, further comprising alignment layers between the silicon substrate and the glass substrate, and an indium tin oxide (ITO) layer next to the glass substrate.

9. The method as claimed in claim 8, wherein the alignment layers are polyimide layers to define walls of each die holding the liquid crystal material therein and to provide electrical isolation between the silicon substrate and the glass substrate which sandwich the liquid crystal material.

10. A method of manufacturing liquid crystal devices on a silicon substrate, comprising:
    obtaining a silicon substrate having a plurality of die arranged in an array, and a glass substrate having scribe lines and openings for filling liquid crystal;
    providing alignment marks on the silicon substrate between dies, and on the glass substrate within the scribe lines;
    attaching the glass substrate having openings to the silicon substrate using the alignment marks on the glass substrate and on the silicon substrate to form a silicon-glass assembly;
    filling liquid crystal, via the openings on the glass substrate, into a cell gap of each die on the silicon-glass assembly, and sealing the openings on each die to form a liquid crystal device on the silicon-glass assembly;
    removing a portion of the glass subatrate to expose the silicon substrate and facilitate testing of the liquid crystal device; and
    separating liquid crystal devices from the silicon-glass assembly along the scribe lines on the glass substrate.

11. The method as claimed in claim 10, further performing an electro-optical sort testing of each liquid crystal device on the silicon-glass assembly for electrical functionality and imager functionality after the liquid crystal fill but before liquid crystal devices are separated from the silicon-glass assembly along the scribe lines.

12. The method as claimed in claim 11, wherein the scribe lines and the alignment marks on the glass substrate are designed to match scribe streets between the dies and the alignment marks on the silicon substrate.

13. The method as claimed in claim 11, wherein the liquid crystal is filled into the cell gap by bringing a liquid crystal material onto the glass substrate after creating vacuum either locally on each die of the silicon-glass assembly or globally on all dies of the silicon-glass assembly.

14. The method as claimed in claim 11, wherein the electro-optical sort testing of each liquid crystal device on the silicon-glass assembly is performed by selectively singulating the silicon-glass assembly to expose bond pads and scribe streets on the silicon substrate and electrically connecting the bond pads with a sort tester equipped with projection optics to test for electrical functionality and imager functionality.

15. The method as claimed in claim 11, wherein each liquid crystal device, after tested for electrical functionality and imager functionality, is packaged into a flex cable or assembled into an electronics package with a variety of different contacts for connecting to an external source.

16. The method as claimed in claim 11, wherein the glass substrate is attached to the silicon substrate by an epoxy seal serving as a spacer in a form of a sphere or a rod dispensed and dispersed on the silicon substrate to provide cell gap control and uniformity.

17. The method as claimed in claim 11, further comprising alignment layers between the silicon substrate and the glass substrate, and an indium tin oxide (ITO) layer next to the glass substrate.

18. The method as claimed in claim 17, wherein the alignment layers are polyimide layers to define walls of each die holding the liquid crystal material therein and to provide electrical isolation between the silicon substrate and the glass substrate which sandwich the liquid crystal material.

19. A liquid crystal device package having a silicon substrate bonded to a glass substrate having scribe lines and openings for containing a liquid crystal material between the silicon substrate and the glass substrate, the liquid crystal device package manufactured by:
 providing alignment marks on the silicon substrate between dies, and on the glass substrate within the scribe lines;
 attaching the glass substrate having openings to the silicon substrate using the alignment marks on the glass substrate and on the silicon substrate to form a silicon-glass assembly;
 filling liquid crystal, via the openings on the glass substrate, into a cell gap of each die on the silicon-glass assembly, and sealing the openings on each die to form a liquid crystal device on the silicon-glass assembly;
 removing a portion of the glass substrate to expose the silicon substrate and facilite testing of the liquid crystal device; and
 separating individual liquid crystal devices from the silicon-glass assembly along the scribe lines on the glass substrate.

20. The liquid crystal device package as claimed in claim 19, wherein each liquid crystal device on the silicon-glass assembly is sort tested for electrical functionality and imager functionality after the liquid crystal fill but before liquid crystal devices are separated from the silicon-glass assembly along the scribe lines.

21. The liquid crystal device package as claimed in claim 20, wherein the scribe lines and the alignment marks on the glass substrate are designed to match scribe streets between the dies and the alignment marks on the silicon substrate.

22. The liquid crystal device package as claimed in claim 20, wherein the liquid crystal is filled into the cell gap by bringing a liquid crystal material onto the glass substrate after creating vacuum either locally on each die of the silicon-glass assembly or globally on all dies of the silicon-glass assembly.

23. The liquid crystal device package as claimed in claim 20, wherein the electro-optical sort testing of each liquid crystal device on the silicon-glass assembly is performed by selectively singulating the silicon-glass assembly to expose bond pads and scribe streets on the silicon substrate and electrically connecting the bond pads with a sort tester equipped with projection optics to test for electrical functionality and imager functionality.

24. The liquid crystal device package as claimed in claim 20, wherein each liquid crystal device, after tested for electrical functionality and imager functionality, is packaged into a flex cable or assembled into an electronics package with a variety of different contacts for connecting to an external source.

25. The liquid crystal device package as claimed in claim 20, wherein the glass substrate is attached to the silicon substrate by an epoxy seal serving as a spacer in a form of a sphere or a rod dispensed and dispersed on the silicon substrate to provide cell gap control and uniformity.

26. The liquid crystal device package as claimed in claim 20, further comprising alignment layers between the silicon substrate and the glass substrate, and an indium tin oxide (ITO) layer next to the glass substrate.

27. The liquid crystal device package as claimed in claim 26, wherein the alignment layers are polyimide layers to define walls of each die holding the liquid crystal material therein and to provide electrical isolation between the silicon substrate and the glass substrate which sandwich the liquid crystal material.

* * * * *

UNITED STATES PATENT AND TRADEMARK OFFICE
CERTIFICATE OF CORRECTION

PATENT NO. : 6,891,592 B2
APPLICATION NO. : 10/205469
DATED : May 10, 2005
INVENTOR(S) : Magana et al.

It is certified that error appears in the above-identified patent and that said Letters Patent is hereby corrected as shown below:

In column 6, at line 37, after "material", insert --.--.

In column 11, at line 43, delete "facilite", and insert --facilitate--.

Signed and Sealed this

Fifth Day of September, 2006

JON W. DUDAS
*Director of the United States Patent and Trademark Office*